(12) United States Patent
Krauthamer

(10) Patent No.: US 11,467,480 B2
(45) Date of Patent: Oct. 11, 2022

(54) SMOOTHED FACETED SCREEN SYSTEMS AND METHOD

(71) Applicant: Universal City Studios LLC, Universal City, CA (US)

(72) Inventor: Akiva Meir Krauthamer, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 17/205,874

(22) Filed: Mar. 18, 2021

(65) Prior Publication Data
US 2021/0294198 A1    Sep. 23, 2021

Related U.S. Application Data

(60) Provisional application No. 62/993,459, filed on Mar. 23, 2020.

(51) Int. Cl.
| | |
|---|---|
| *G03B 21/60* | (2014.01) |
| *G03B 21/20* | (2006.01) |
| *G09F 9/33* | (2006.01) |
| *G09G 3/32* | (2016.01) |

(52) U.S. Cl.
CPC ......... *G03B 21/60* (2013.01); *G03B 21/2046* (2013.01); *G09F 9/33* (2013.01); *G09G 3/32* (2013.01)

(58) Field of Classification Search
CPC ....... G09F 9/3026; G09F 9/302; G09G 3/003; G09G 2300/026; G09G 2380/12; G06F 3/011; G06F 3/144; G09B 9/30; G09B 9/323; G09B 9/32; G09B 9/326;
(Continued)

(56) References Cited

U.S. PATENT DOCUMENTS

| | | |
|---|---|---|
| 8,408,739 B2 | 4/2013 | Villard et al. |
| 8,651,693 B2 | 2/2014 | Josefowicz et al. |
| 8,979,294 B2 | 3/2015 | An et al. |
| (Continued) | | |

FOREIGN PATENT DOCUMENTS

| | | |
|---|---|---|
| CN | 201199412 Y | 2/2009 |
| WO | 2019097431 A1 | 5/2019 |

OTHER PUBLICATIONS

PCT/US2021/023629 International Search Report and Written Opinion dated Jul. 12, 2021.

*Primary Examiner* — Koosha Sharifi-Tafreshi
(74) *Attorney, Agent, or Firm* — Fletcher Yoder P.C.

(57) ABSTRACT

A faceted screen system includes a curved backing surface, a first planar panel coupled to the curved backing surface, and a second planar panel coupled to the curved backing surface. The first planar panel and the second planar panel are angled towards a hypothetical focal point of the curved backing surface. The faceted screen system also includes a first plurality of light sources disposed on the first planar panel and a second plurality of light sources disposed on the second planar panel. Individual light sources of the first plurality of light sources are oriented at respective different angles relative to the first planar panel to emit light towards the hypothetical focal point. Individual light sources of the second plurality of light sources are oriented at respective different angles relative to the second planar panel to emit light towards the hypothetical focal point.

20 Claims, 9 Drawing Sheets

(58) Field of Classification Search
CPC ........ G09B 9/307; G09B 9/308; G09B 9/301; H04N 9/3147; G03B 21/56; G03B 21/60
USPC ................ 345/1.3; 348/36; 359/451; 434/38
See application file for complete search history.

(56) References Cited

U.S. PATENT DOCUMENTS

| | | |
|---|---|---|
| 9,497,447 B2 | 11/2016 | Green et al. |
| 10,253,948 B1 | 4/2019 | Pickard |
| 2012/0162996 A1 | 6/2012 | Ikeda |
| 2017/0208321 A1 | 7/2017 | Monnerat et al. |
| 2018/0088455 A1* | 3/2018 | Cippant ................. G03B 37/06 |
| 2019/0199982 A1* | 6/2019 | Schubert .............. H04N 13/324 |

* cited by examiner

SMOOTHED FACETED SCREEN SYSTEMS AND METHOD

CROSS-REFERENCE TO RELATED APPLICATION

This application claims the benefit of U.S. Provisional Application No. 62/993,459, entitled "SMOOTHED FACETED SCREEN SYSTEMS AND METHOD," filed on Mar. 23, 2020, which is hereby incorporated by reference in its entirety for all purposes.

FIELD OF DISCLOSURE

The present disclosure relates generally to the field of display techniques. More particularly, embodiments of the present disclosure relate to systems and methods for displays that include a faceted screen and that operate to smooth transitions between individual facets of the faceted screen.

BACKGROUND

Recently there has been a growing interest in viewing content on immersive displays. Curved or irregularly shaped display screens have grown in popularity alongside the growing interest in immersive displays. Curved display screens may be used as part of home television or gaming setups to at least partially surround a viewer to create an immersive viewing experience. Although curved display screens are desirable, issues such as cost and manufacturing have shown to be challenging. Even at relatively small sizes, curved displays are more costly than flat counterparts. Scaling up of a curved display screen for environments that accommodate multiple users may be even more cost-prohibitive.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a faceted screen system includes a curved backing surface, a first planar panel coupled to the curved backing surface, and a second planar panel coupled to the curved backing surface. The first planar panel and the second planar panel are angled towards a hypothetical focal point of the curved backing surface. The faceted screen system also includes a first plurality of light sources disposed on the first planar panel and a second plurality of light sources disposed on the second planar panel. Individual light sources of the first plurality of light sources are oriented at respective different angles relative to the first planar panel to emit light towards the hypothetical focal point. Individual light sources of the second plurality of light sources are oriented at respective different angles relative to the second planar panel to emit light towards the hypothetical focal point.

In an embodiment, a faceted screen system includes a display panel assembly. The display panel assembly has a first planar panel and a second planar panel. The first planar panel and the second planar panel are oriented such that a first hypothetical line extending through an edge of the first panel and a second hypothetical line extending through an edge of the second planar panel form a hypothetical vertex. A first plurality of light sources are disposed on the first planar panel. A first individual light source of the first plurality of light sources forms a first angle with a surface of the first planar panel. A first neighboring light source of the first plurality of light sources forms a second angle with the surface of the first planar panel. The first angle is different than the second angle. The faceted screen system also includes a second plurality of light sources disposed on a second surface of the second planar panel. A second individual light source of the second plurality of light sources forms a third angle with the second surface of the second planar panel. A second neighboring light source of the second plurality of light sources forms a fourth angle with the second surface. The third angle is different than the fourth angle.

In an embodiment, a faceted screen control system includes a plurality of actuators coupled to respective light sources of a plurality of light sources and a controller that receives an input indicative of a selected focal point towards which to orient a plurality of sources disposed on a plurality of planar display panels that forms a faceted assembly approximating a curve. The controller determines an orientation of each light of the plurality of light sources, e.g., whereby the orientation corresponds to light emitting from each of the plurality of light sources traversing the focal point. The controller also send a control command to the plurality of actuators to actuate the respective light sources of the plurality of light sources to cause the respective light sources to emit light towards the selected focal point.

In an embodiment, a method for manufacturing a display panel of an assembly of display panels assembled to approximate a curve involves receiving a first light source and a second light source configured to be coupled on the display panel. The method also involves determining a first angle of the first light source to orient the first light source relative to the display panel such that light emitted from the first light source is directed toward a hypothetical focal point of the curve. The method also includes coupling the first light source to the planar display panel. The method further includes determining a second angle of the second light source to orient the second light source. The second angle is different from the first angle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
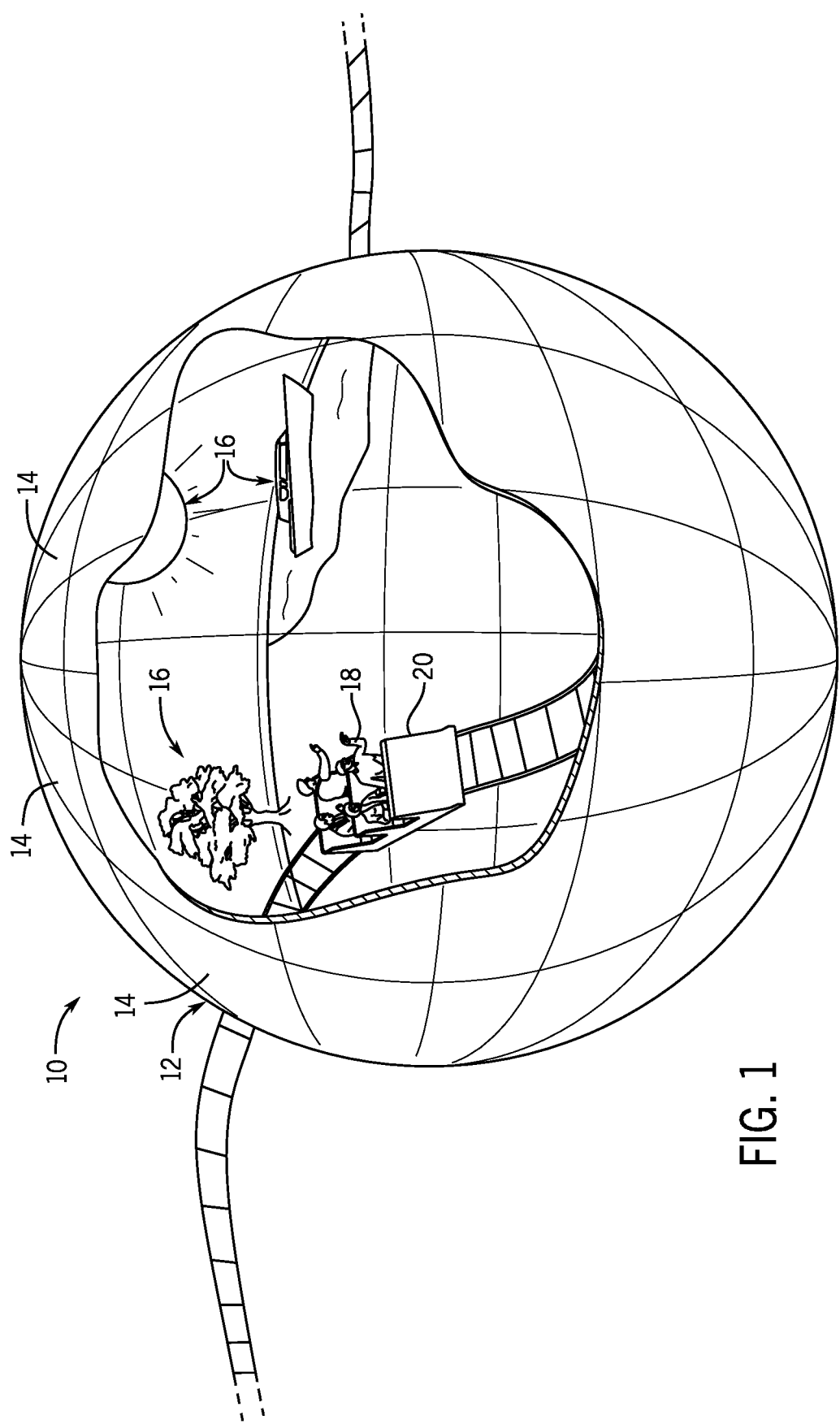
FIG. 1 is a perspective view of a dome system having a screen smoothing system integrated into the displays of a dome, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosed techniques relate to presenting content on display screens in a manner that may increase the viewer enjoyment and immersiveness of the presentation. Specifically, systems and methods for smoothing displays of a faceted screen are provided herein. Using curved display screens provides an immersive viewing experience, wide viewing angle, increased depth, contrast, and the like. Yet, curved display screens typically have difficulties in manufacturing, storage, and wiring, to name a few. Faceted screens that approximate a curve (e.g., a regular curve, a compound curve, a curved portion of an irregular shape) by joining flat surfaces at an angle are easier to work with. That is, individual facets are assembled together to approximate the desired shape of the curve and to replace or provide a less costly alternative to a single curved display screen. However, problems may also arise when content is viewed on a collection or group of flat surfaces as compared to a unitary curved display screen. In particular, seams between flat surfaces of the individual facets of the faceted screen may be visible by viewers of the content. Although one may minimize the visual impact of the seams by decreasing an angle between adjoining flat surfaces, this technique may require an increased number of flat surfaces for any given curve. Techniques that lessen the visual impact of the edges (e.g., seams) without manipulating an angle between flat surfaces and/or increasing an amount of flat surfaces for a given curve are provided.

The present techniques provide faceted screens (e.g., faceted display screens) formed from a plurality of individual facets (e.g., individual flat or planar display panels) and having a decreased visual impact of the seams between the individual facets of the faceted screen. Specifically, by manipulating or angling one or more light sources disposed on the individual flat display panels towards a common location (e.g., a common point), a visual impact of seams between the panels may be decreased, irrespective of the angle formed between adjoining panels. The common location or direction to which the light sources are oriented may be a focal point of a curve that is being approximated by the faceted screen. Indeed, the light sources may be oriented on the displays such that each light source is angled to emit light toward the focal point of the curve. The angles between adjacent and/or neighboring light sources may be varied relative to one another to achieve the desired effects.

Further, the present techniques also include mechanisms for actuating the angle between light sources disposed on the display panels of faceted screens. In particular, an aspect of a light source (e.g., a lens, casing of the light source, etc.) disposed on one of the display panels of the faceted screen may be actuated such that a brightness of light emitted from the light source is increased when the light emitted from the light source is observed from the common location to which the light sources of the displays are oriented. To put it another way, an actuator may be coupled to each light source disposed on display panels of the faceted screens. The actuator may control an angle at which each light source is oriented. In this way, the display panels of the faceted screens, or rather, the light sources on the display panels, may be controlled to approximate a range of different curves. That is, the light sources may be controlled (via mechanical mechanisms, electrical mechanisms, or a combination of both mechanical and electrical mechanisms) to point toward different locations such as a focal point of a curve. Thus, displays of the faceted screens may be controlled to approximate a range of different curves by controlling the angle at which light sources on the displays are oriented. Neighboring light sources may be controlled to slightly or largely vary based on the type of curve to be approximated.

The present techniques also include positioning a secondary lens on a light source of a display panel such that light leaving the light source is redirected at a specific angle such that a brightness of the light is relatively increased at a specific point on a plane that is perpendicular to the direction of the light at the location of the specific point.

Turning to the drawings, FIG. 1 is a perspective view of a dome ride system 10 having a faceted display screen implemented as a dome 12 with individual facets formed from display panels 14 of the dome 12. The display panels 14 approximate the curved shape of the dome 12. The display panels 14 display visual content 16 for a guest 18 in the dome 12. In particular, the display panels 14 include displays screens (e.g., display panels, planar display panels) that have light sources (e.g., pixels) disposed on them. The display panels 14, which are oriented to follow a curve given by the shape of the dome 12, contain the light sources that emit light to present the visual content 16 (e.g., the content) on/through the display panels 14. The light sources on each of the display panels 14 are angled relative to each other so as to direct emitted light toward a common point such as a focal point of a curve being approximated by the arrangement of the display panels 14, as generally discussed with respect to FIG. 3. In other words, the light sources on a particular display of a particular faceted screen may each be angled relative to one or more other light sources on the particular display to direct an increased brightness towards a common point such as a focal point of the dome 12. More specifically, the light sources are angled such that light emitted from the light sources have an increase in brightness at the common point such as a focal point of the curve. This common point may be located near the guest 18, who is located on a ride car 20.

Directing light such that an increase in brightness is observed at the common location may lessen the visual impact of seams between the display panels 14 at or near the common location. This effect may arise due to an increase in overall contrast observed from the common location. The overall contrast may increase due to the brightness of light emitted from the light sources on the display panels 14 being increased at or near the common location.

The display panels 14 approximate the curve of the dome 12. In particular, the display panels 14 are angled with respect to each other to approximate the curve. The light sources on a particular display panel 14 are also angled with respect to neighboring light sources on the particular display panel 14 to point towards a common location such as a hypothetical focal point of a curve given by the dome 12. For purposes of this discussion, the hypothetical focal point may be used in content of a curve that is being approximated by one or more display panels of a faceted screen. Specifically, the hypothetical focal point may refer to a point at which light rays meet (e.g., converge) after being emitted from the display panels 14. As another example, the hypothetical focal point may be a point traversed by light upon reflection off a hypothetical reflective curved surface after being incident on the hypothetical reflective curved surface along an axis parallel to an optical axis of the hypothetical reflective curved surface. The hypothetical reflective curved surface may be a hypothetical true curved surface that is being approximated by the faceted screen.

The light sources in each faceted display of the faceted dome ride system 10 may be angled toward a hypothetical focal point (or focal plane). In particular, each light source may be angled such that a maximum brightness of the light source is realized at or near the hypothetical focal point. The hypothetical focal point may be near the guest 18. Having the light sources point towards the hypothetical focal point may lessen the visual impact of the seams at the joining edges of the flat surfaces.

Figure 2A:
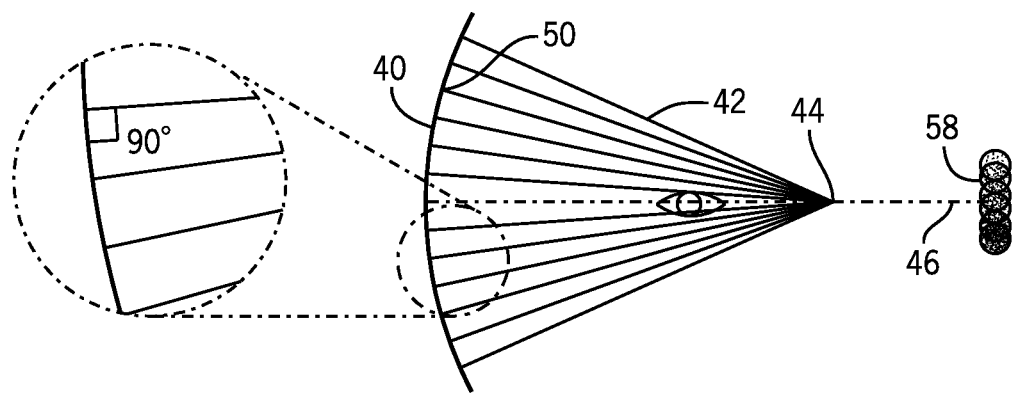
FIG. 2A is a schematic illustration of a curved display screen.
Figure 2B:
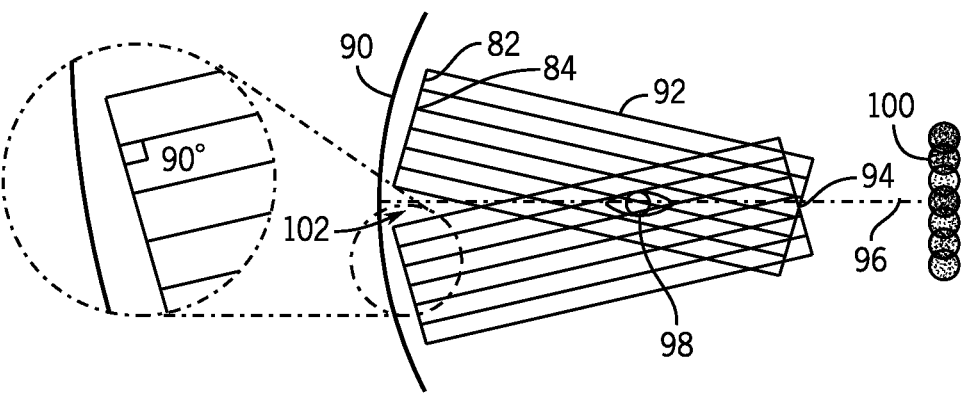
FIG. 2B is a schematic illustration of an unsmoothed assembly of planar display panels.

FIG. 2A is a schematic illustration of a more costly curved display screen formed without facets and illustrating the path of light from the display screen to a user. FIG. 2B is a schematic illustration of certain disadvantages associated with assemblies of flat display panels to approximate the curve of FIG. 2A to provide a less expensive curved display. FIG. 2A is a schematic illustration of a curved display screen 40 having light rays 42 emit from different positions on the curved display screen 40 and converge at a focal point 44 along an optical axis 46 of the curved display screen 40. Light sources 50 are orientated toward the local normal of the curved display screen 40. To put it another way, the lights 50 are generally angled to emit light (shown as light rays 42) at 90 degrees relative to a line tangent to the position along the curved display panel 40 to generate a received image 58.

In another example, FIG. 2B is an arrangement having planar components 82 coupled to a backing 90, but without the faceted screen smoothing as provided herein. As shown in FIG. 2B, light rays 92 emitting from the lights 84 do not align towards a common location, such as a hypothetical focal point 94, of the backing 90, which is located along an optical axis 96 (e.g., hypothetical optical axis) of the backing 90. In contrast, the lights 84 are oriented to point perpendicular to a plane defined by each respective planar component 82. A viewer 98 located on the optical axis 96 corresponding to the backing 90 may observe an image 100 with a low overall contrast ratio due to spreading of the received light, which may be undesirable. In other words, the image 100 received by the viewer 98 may be seen with seams (e.g., a seam 102) between the planar components 82 that are highly visible due to the low overall contrast between the colors emitted from the light 84. Thus, the curved display of FIG. 2A represents a more costly display modality, and the display of FIG. 2B formed from planar components, which lacks smoothing as disclosed herein, although potentially lower in cost and easier to manufacture, tends to have decreased image quality due to the visibility of the seams and the decrease in contrast.

Figure 3:
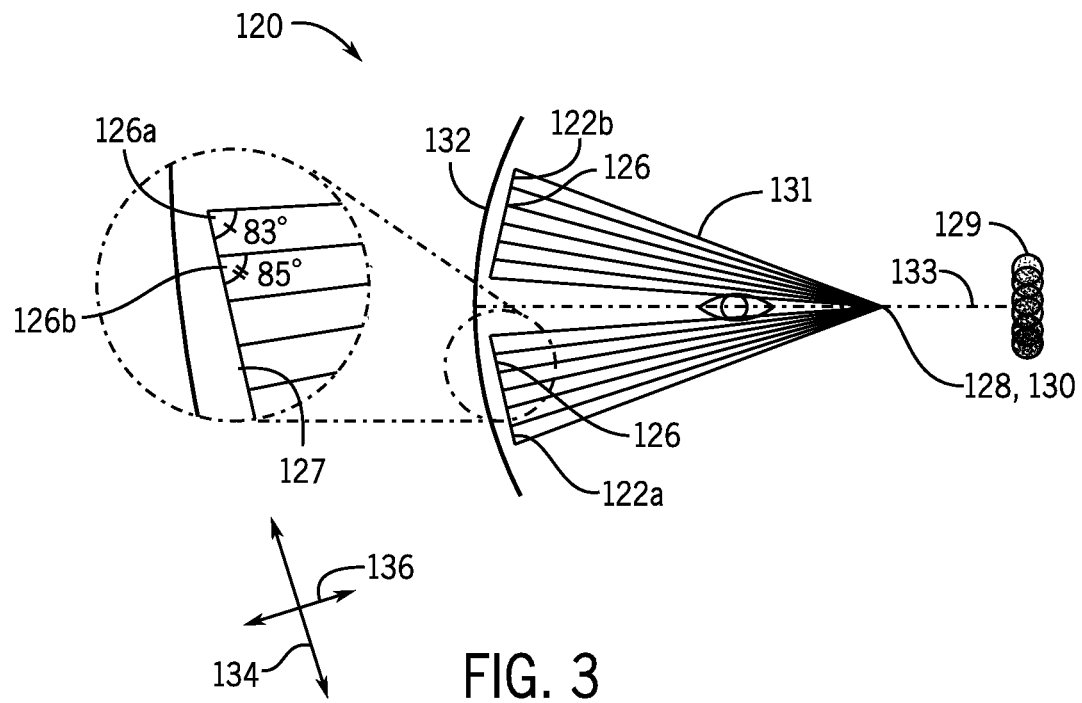
FIG. 3 is a schematic illustration of a smoothed faceted screen assembly formed from planar display panels having light sources that are angled towards a hypothetical focal point of a curved backing surface, in accordance with an embodiment of the present disclosure.

Provided herein is a faceted screen system smoothing system and method that is lower in cost to manufacture than the curved display screens yet retains an ample amount of overall contrast and decreases the visibility of the seams between the joining of flat surfaces. FIG. 3 is a top view of a smoothed faceted screen assembly 120 having facets in the form of planar display panels 122 (e.g., LED panels) with light sources 126 disposed on the planar display panels 122. The light sources 126 have variable or relatively different orientations to improve alignment at a common point 128 that corresponds to a hypothetical focal point 130 of the desired curved shape (e.g., a shape corresponding to the curving backing surface 132). As provided herein, the orientation of an individual light source 126 may be considered to be along an axis of the emitted light 131 or along an axis at which the emitted light has a maximum brightness/intensity. In one embodiment, the angle of the light source 156 may be the smallest angle formed between the light source 126 and a surface 127 (e.g., a viewer-facing surface) of the planar display panel 122. In an embodiment, the angle of the light source 156 may be the smallest angle formed between an axis of relative maximum brightness emitted from the light source 126 and a surface 127 (e.g., a viewer-facing surface) of the planar display panel 122. In an embodiment, the angle of the light source 156 may be the smallest angle formed between an axis through midpoint of a lens of the light source 126 and passing through the comment point 128 and a surface 127 (e.g., a viewer-facing surface) of the planar display panel 122.

The light sources 126 are angled to emit light with a relative maximum in brightness oriented towards a common point 128 such as a hypothetical focal point 130 of a curved backing surface 132. As a result of the smoothing, which distributes the orientations of the light sources such that the alignment at the common point is improved rather than spread out (as in FIG. 2B), the received image 129 has better properties for the viewer, and any seams between the display panels are less visible. This improved alignment is achieved without requiring that the display panels 122 be curved or form a larger curved assembly, which is more expensive.

The display panels 122 may be disposed across an optical axis 133 of the curved backing surface 132 at equal distances on either side of the curved backing surface 132. Further, a hypothetical vertex may be formed by a first line extending from a first edge of the planar display panel 122a and a second line extending from a second edge of the planar display panel 122b. The hypothetical vertex formed may be an obtuse angle depending on the orientation of the display panels 122. However, the angles formed between individual display panels 122 may be selected based on a desired shape of the curve or irregular structure formed by the faceted screen assembly 120.

The curved backing surface 132 (e.g., a three-dimensional surface) may be formed from any type of material that may provide support (e.g., structural support, electrical support, etc.) for the planar display panels 122 and/or light sources 126 disposed on the planar display panels 122. Further, it should be understood that the faceted screen assembly 120 may not include any curved backing surface 132 or may include a backing or support structure having a different shape. The planar display panels 122 may also serve as support structure to support the light sources 126 physically and electrically. In some embodiments, the planar display panels 122, may be a collection of printed circuit boards having circuitry configured to power the light sources 126.

As mentioned above, each light source 126 is angled relative to an adjacent and/or neighboring light source 126 towards a common point 128 such as the hypothetical focal point 130 of the curved backing surface 132. In particular, each light source 126 is lensed and oriented such that the light source 126 emits light having a relative brightness maximum at a viewing angle given by the common point 128. For example, FIG. 3 displays a light source 126a on the planar display panel 122a oriented to emit light at an angle of 83 degrees relative to the planar display panel 122a. In particular, the planar display panel 122a is parallel to an axis 134. The axis 136 is parallel to the normal of the planar display panel 122a. The 83 degree angle is the angle between the axis 134 along a plane (e.g., top surface) of the planar display panel 122a and a unit vector parallel to the direction of the light emitted from the light source 126a. An adjacent light source 126b is illustrated as being oriented to emit light at an angle of 85 degrees relative to the planar display panel 122a.

As illustrated in FIG. 3, the angles between adjacent and/or neighboring light sources on the same planar display panel 122 may be different relative to one another. Indeed, the individual light source 126b is at an 85 degree angle while the neighboring light source 126a is at an 83 degree angle. Further, another neighboring light source 126 may be at an 87 degree angle. These angular differences may correspond to an optimal angle of orientation at the specific position of the light source 126 on the planar display panel 122. The optimal angle may correspond to an angle at which light emitted from a specific light source 126 on the specific position of the planar display panel most accurately approximates light that would leave from a corresponding hypothetical curved display panel having a curved shape that conforms to the shape formed by the assembly of display panels 122. In an embodiment, the corresponding curved display panel may generally form the shape of the curved backing surface 132 or of a curve that touches at least one point on each display panel 122. Thus, individual light sources 126 on the planar display panels 122 are oriented at respective different angles relative to adjacent light sources 126 and/or the planar display panels 122 to which the individual light sources 126 are coupled. In some embodiments, at least one light source 126 is at or near a 90 degree angle relative to the planar display panel 122 while other lights sources are not at 90 degree angles. Further, the planar display panels 122a, 122b may mirror angular orientations across the optical axis 133. Although, in some embodiments, a planar display panel may extend through the optical axis 133.

Moreover, angles of individual light sources 126 may successively increase or decrease in magnitude toward the optical axis relative to a common axis (e.g., a common vector). For example, the increase or decrease may be a stepwise increase or decrease or change in magnitude of a common factor. It should be noted that the orientation angles of the light sources 126 may be within a range of angles (1-90 degrees) selected to emit light toward a hypothetical focal point 130 and align the light at the common point 128 and at a desired distance from the faceted screen assembly 120. It should also be noted that although the common point 128 (e.g., common location) and the hypothetical focal point 130 are shown to occupy the same position along the optical axis 133, the common point 128 to which the light sources 126 are oriented may be a location different that the hypothetical focal point 130 and/or a location not along the optical axis 133. This will be discussed in detail later with respects to FIG. 7.

Likewise, a brightness of the light source 126 may achieve at least a relative maximum intensity as seen from the perspective of a viewer. For example, in some embodiments, the light sources are light emitting diodes (LEDs). These LEDs may be lensed such that the brightness of each LED is increased when the LED is viewed from directly in front of the LED. In other words, the brightness of the LED is brightest when the LED's light is viewed straight on. To put it another way, the brightness of the LED is brightest when an angle between the line of sight of a viewer and a hypothetical line extending from a front-facing orientation of the LED is minimized. When an LED is lensed, the brightness of the LED may decrease as the viewing angle increases. In particular, the brightness may decrease as the viewing angle exceeds the lens angle of the LED. The lens angle of the LED may refer to an angle by which, when exceeded, the brightness may decrease. For example, using spherical coordinates, a center of a lens may be located at the origin.

Figure 4:
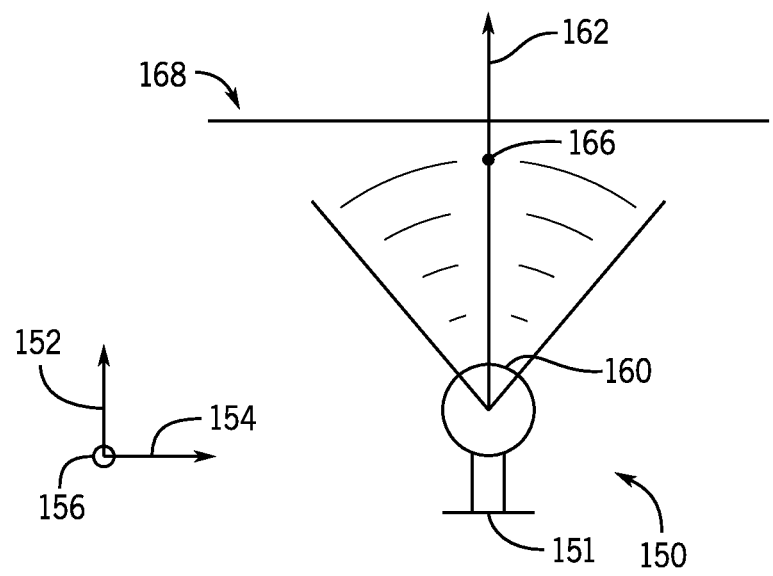
FIG. 4 is a schematic illustration of a lensed light emitting diode (LED) light source on a planar display panel, in accordance with an embodiment of the present disclosure.

As an illustration, FIG. 4 is an exemplary cross-sectional view of a lensed LED light source 150 disposed on a planar display panel 151. An axis 152 is oriented along a longitudinal direction of the lensed LED light source 150. An axis 154 is oriented parallel along a width of the lensed LED light source 150. An axis 156 extends along a depth of the lensed LED light source 150. The lensed LED light source 150 includes a dome-shaped lens 160 that helps to direct emitted light such that a relative increase in brightness is observed along a path, which is indicated by the arrow 162 and is parallel to the axis 152. When observing the lensed LED light source 150, one may observe an increased brightness at a position 166, which, in some embodiments, is located along the axis 152 centered on a center of the lensed LED light source 150. Specifically, if one projects light emitted from the lensed LED light source 150 onto a plane 168 perpendicular to the path 164, one may observe an increased brightness at a point closest to the position 166. It is to be noted that lensed light sources may contain more (or less) elements as shown in FIG. 4. The lensed LED light source 150 is for purely illustrative purposes.

By angling light sources towards a common point such that light emitted from each of the light sources has a relative maximum in brightness as a function of viewing angle at an angle corresponding to line extending from each of the light sources and the common point, the light rays leaving planar display panels may be a closer approximation of light rays that would leave from a true curved panel (e.g., FIG. 2A) than as observed in FIG. 2B. Indeed, a viewer may obtain a higher overall contrast viewing content on the assembly of FIG. 3 compared with the assembly of FIG. 2B. The light sources may be angled relative to the planar display panel that they are disposed upon and relative to each other. Indeed, adjacent and/or neighboring light sources may have slight angle variations in order to approximate a true curved panel (e.g., FIG. 2B) at a specific location.

As provided herein, the angle of the light source 150 with the panel 151 may be an angle formed by an axis through a point of maximum brightness of the light emitted through the lens 166 with the panel 151. Thus, as shown in FIG. 4, the angle through the maximum brightness, and along path 162, is generally perpendicular to the panel 151. However, as disclosed below, actuators may adjust the position of the lens relative to the panel to change the axis of maximum brightness by causing a change in orientation of the light source 150 relative to the panel 151.

Figure 5:
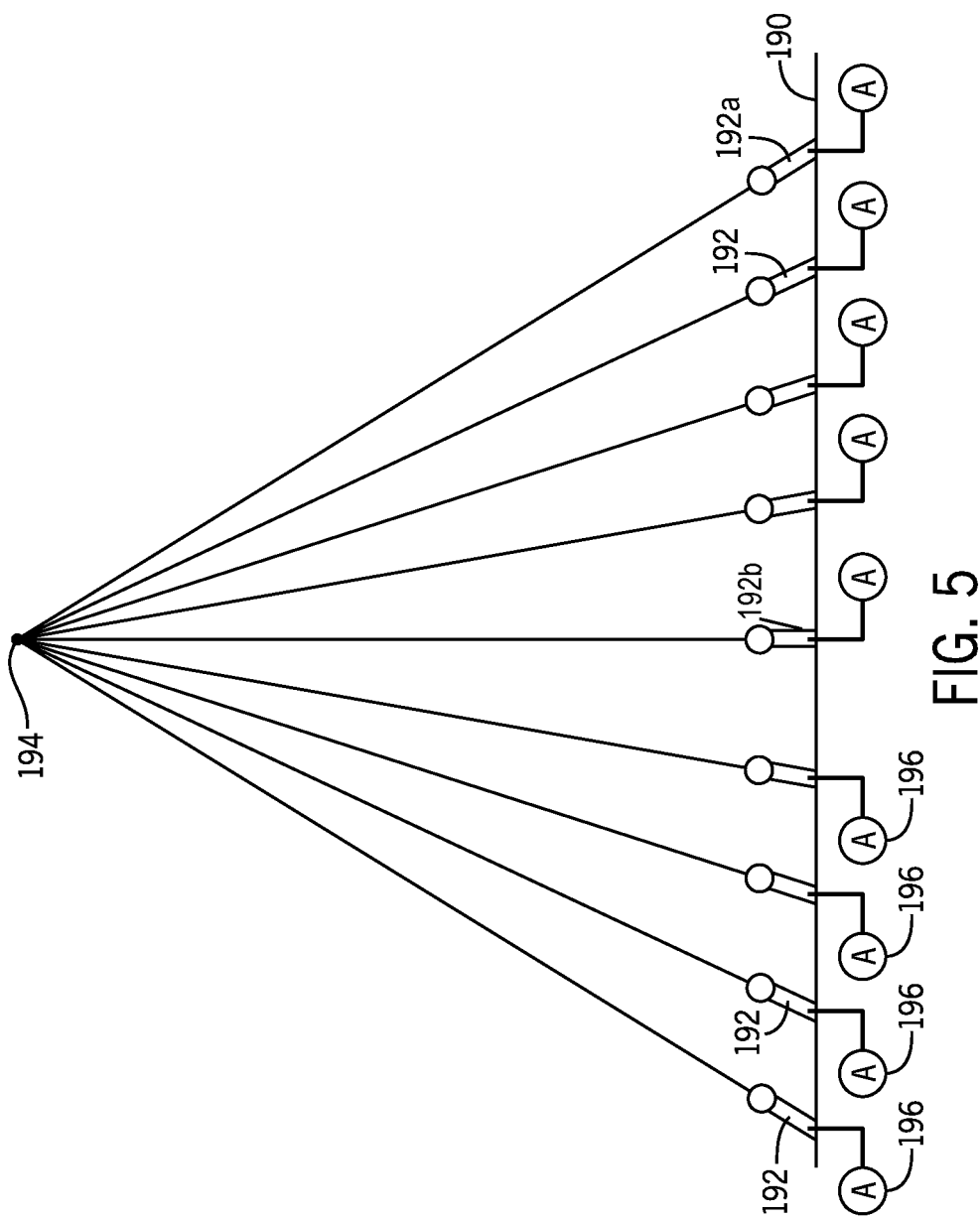
FIG. 5 is a side view of a planar display panel having an arrangement of light sources angled toward a hypothetical focal point of a curve, in accordance with an embodiment of the present disclosure.

In certain embodiments, the lens 166 is a domed lens and the light emitted is brighter at a particular point on the dome. Thus, the axis passes through a particular point on the dome. In other embodiments, the light source 150 has a generally flat lens. In an embodiment, the angle of the light source 150 with the panel 151 may be an angle formed with the panel 151 by an axis through a midpoint of the dome, as shown in FIG. 4, or an through a midpoint of a flat lens and perpendicular to a flat lens. FIG. 5 is a side view of a planar display panel 190 having light sources 192 coupled to the planar display panel 190 and that are programmable and/or individually addressable to tune an angle during use. The light sources 192 are angled toward a common point 194 such as a hypothetical focal point of a hypothetical curve of which the display panel may be utilized in to approximating such as in an assembly of planar display panels that are faceted. The light sources 192 are each coupled to an actuator 196 that actuates the light sources 192. In particular, the actuators 196 may actuate the light sources 192 such that a brightness of each light source 192 is increased when the light source is viewed from a line extending from a particular light source 192 to the common point 194. As shown in FIG. 5, slight angle variations exist between adjacent light sources 192 on the planar display panel 190 in order to approximate a true curved panel at the specific location of the light source 192 on the planar display panel 190. In one example, the angle, as measured through the axis of maximum brightness between the light source 192 and the point 194, formed by the light source 192a with the panel 190 is smaller than the angle formed by the center light source 192b with the panel 190. The angle between the light source 192a and the panel 190 is smaller than 90 degrees, while the angle between the light source 192b and the panel 190 is about 90 degrees. The actuators 196 coupled to the light sources 192 may actuate the light source 192 such that the light source 192 is oriented in a direction facing the common point 194. In some embodiments, the actuators 196 may be coupled to specific components of the light source 192.

Figure 6:
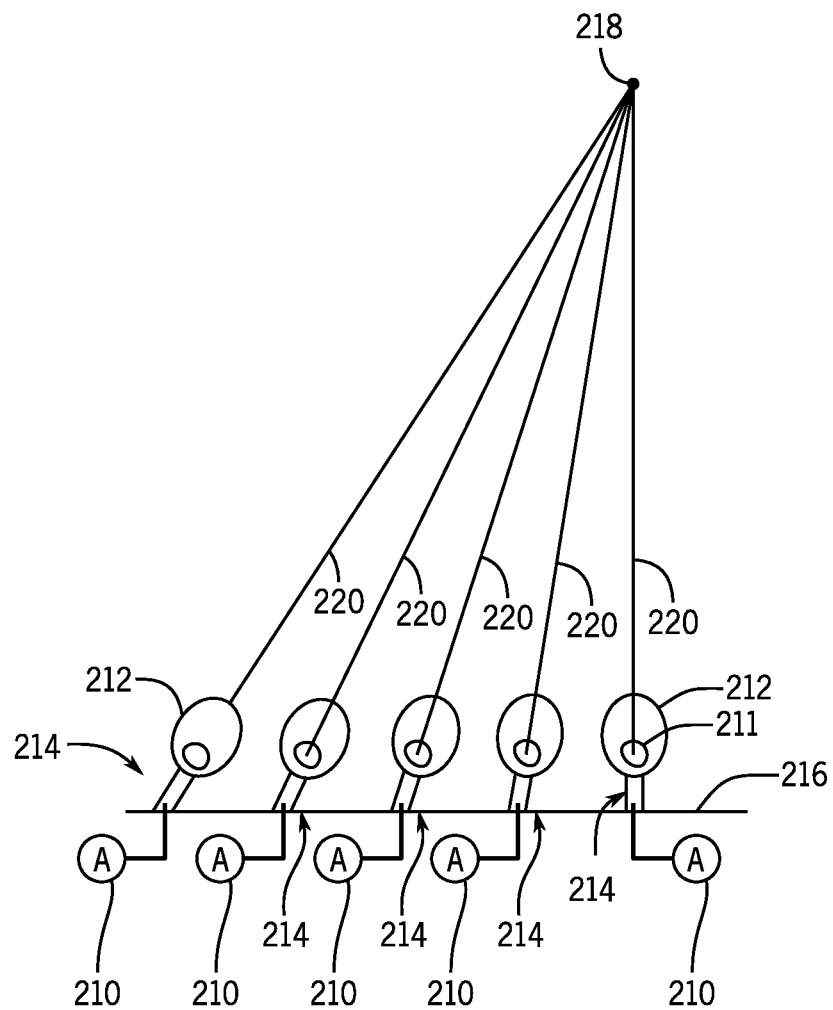
FIG. 6 is a side view of a planar display panel having light sources oriented at the same angle and further having a secondary lenses attached to the light sources such that the secondary lenses direct the light emitted from the light sources towards a hypothetical focal point of a curve, in accordance with an embodiment of the present disclosure.

For example, as shown in FIG. 6, an actuator 210 may be coupled to an integral or removable lens 212 of a light source 214 disposed on a planar display panel 216. The planar display panel 216 may be one panel of a plurality of planar display panels that are utilized to approximate one or more curves. The lens 212 may be a secondary lens of the light source 214. Indeed, in some embodiments, the light source 214 may be a LED having a primary lens 211 and a secondary lens extended radially further from the primary lens 211. The actuator 210 translates and/or rotates the lens 212 such that light emitted from the light source 214 is directed to have a relative maximum brightness when the light source 214 and/or image on the planar display panel 216 is viewed from a common point 218. The lenses 212 may be positioned in front of each light source 214 such that light emitting from each light source 214 is redirected (e.g., refracted) to a desired angle. This setup of light source 214 may allow all light sources 214 on the planar display panel 216 to share the same angular orientation with respect to the planar display panel 216 while the lens 212 of each light source 214 changes to direct light toward the common point 218. The actuators 210 may actuate the lenses 212 such that the light sources 214 emit light with a relative maximum in brightness along a path (e.g., a line) of propagation that traverses the common point 218 (as indicated by the light rays 220). In FIG. 6, the orientation of the light sources 214 may be similar, but the actuators 210 may rotate and/or translate the lenses 212 such that a relative maximum in brightness is observed from a common location. For instance, the actuator 210 is coupled to each lens 212 and may actuate the lens 212 such that light emitting from the light source 214 is directed toward a hypothetical focal point of a curve that is being approximated by an orientation of the planar display panel 216.

Figure 7:
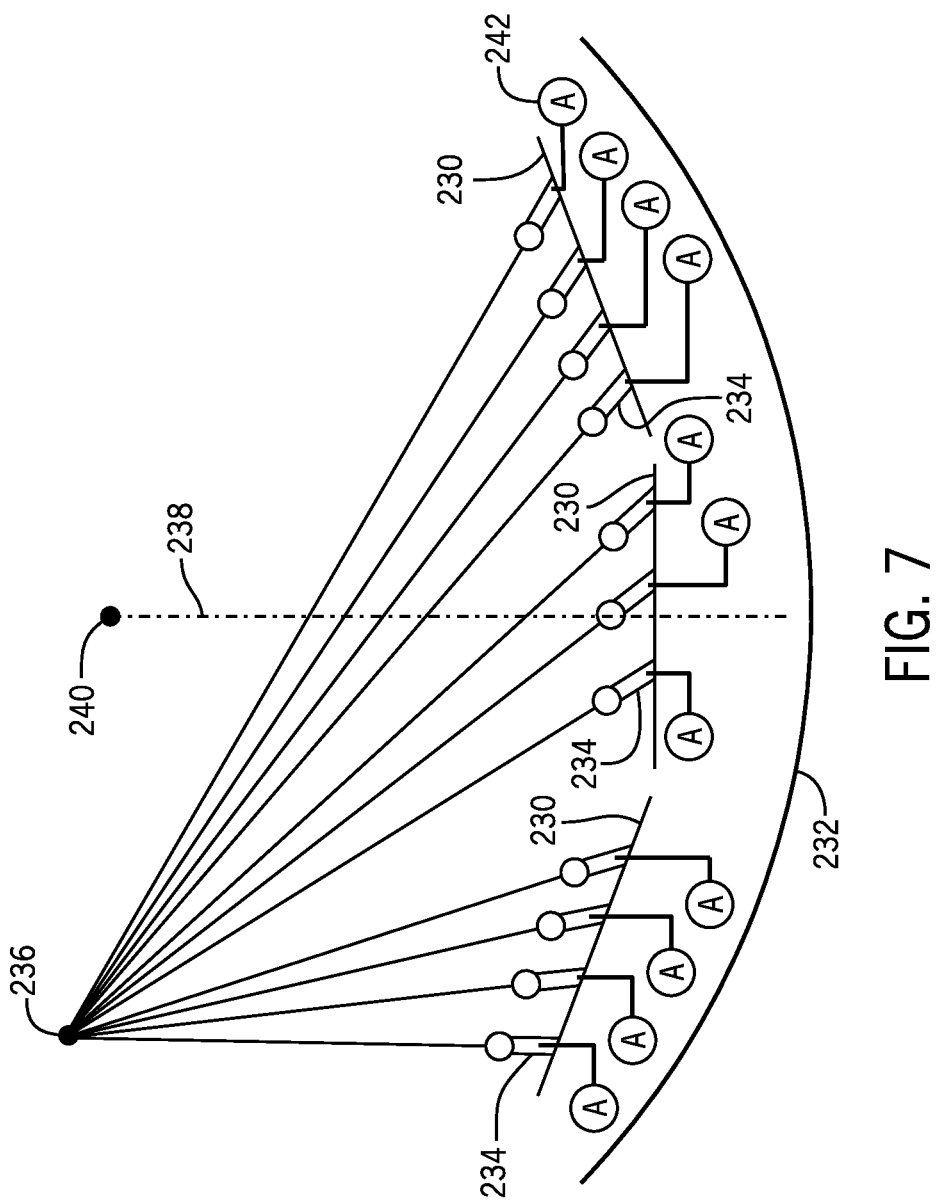
FIG. 7 is a side view of a portion of a row of planar display panels having light sources oriented at different angles on a respective planar display panel such that the light emitted from the light sources are emitted towards a hypothetical focal point of a curve, in accordance with an embodiment of the present disclosure.

FIG. 7 illustrates planar display panels 230 supported by a curved backing surface 232 having light sources 234 that emit light with a relative maximum in brightness towards a common point 236, which is not along an optical axis 238 of the curved backing surface 232. Indeed, the common point 236 to which the light sources 234 are oriented is not the same as a hypothetical focal point 240 of the curved backing surface 232. That is, the light sources 234 are oriented differently to increase a brightness at the common point 236. The light sources 234 have actuators 242 that may allow approximation of a range of curves by controlling a direction in which light is concentrated, increasing an overall contrast ratio at the common location.

Figure 8:
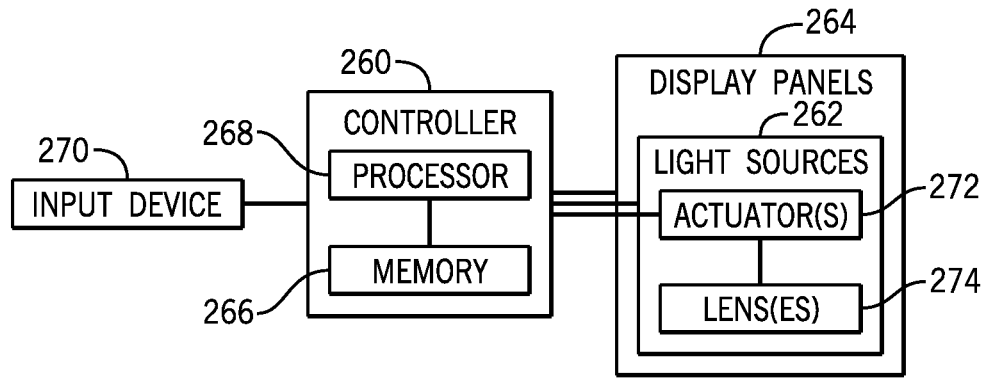
FIG. 8 is a schematic block diagram illustrating an angle controller for controlling an angle of light emitted from a light source on a display panel such that the emitted light has a brightness at or near a hypothetical focal point of a hypothetical curve created by an assembly of display panels, in accordance with an embodiment of the present disclosure.

FIG. 8 is a schematic block diagram illustrating a controller 260, e.g., an actuator controller, for controlling an angle of light emitted from a light source 262 on a display panel 264 (e.g., the display panel 122, display panel 230) such that the emitted light has a brightness at or near a hypothetical focal point of a hypothetical curve created by an assembly of display panels in accordance with an embodiment. In particular, the controller 260 includes a memory 266 and a processor 268. Computer-readable instructions stored in the memory 266 (e.g., non-transitory, tangible, and computer-readable medium/memory circuitry) may be executed by the processor 268. The memory 266 may store specific angles associated with specific curved shapes, and, upon receiving an input from an input device 270 indicative of a type of curve that is to be approximated, the controller 260 may access the specific angles of the light sources 262 on the display panel 264 that corresponds to the desired curve.

The input device 270 may include a display having a graphical user interface such that desired curves and/or focal points may be selected. The controller 260 may then send a command to an actuator 272, which as discussed above, may be coupled to an aspect of the light source 262, the display panel 264, and/or a lens 274 coupled to the light source 262. The command, when executed, may cause the actuator 272 to change an orientation of light emitted from the light sources 262 to have an increased brightness at the hypothetical focal point of the desired curve.

For example, the controller 260 may receive an input indicative of a curve to approximate such as a sphere. In response to receiving the input, the controller 260 may determine an optimal orientation of the light sources 262 and/or the lenses 274, which may be integral or removable from the light sources 262, such that light emitted from each light source 262 has a maximum brightness when an image on the display panel is viewed from a hypothetical focal point of the spherical curved inputted. In some embodiments, the controller 260 may exclude more or less elements than shown in FIG. 8. Indeed, in some embodiments, angles of the light sources 262 may be actuated mechanically rather than electrically. Further, in some embodiments, the angles of the light sources 262 may be actuated via a combination of both via mechanical and electrical mechanisms. The controller 260 may cause, via the actuator 272, the location of maximum brightness to change to a location corresponding to that which was inputted. The new location to which the maximum brightness is observed may correspond to a hypothetical focal point or not.

Figure 9:
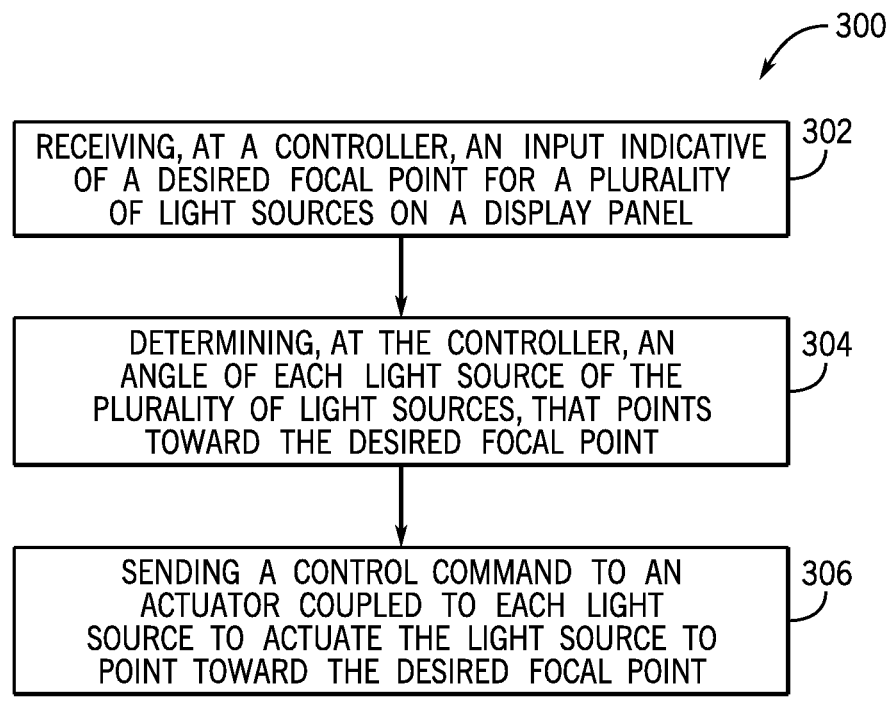
FIG. 9 is a flow chart of a method for actuating a light source toward a focal point of a curve, in accordance with an embodiment of the present disclosure.

FIG. 9 is a flow chart of a method 300 for actuating a light source to emit light toward a focal point of a curve, in accordance with an embodiment. In some embodiments, the method may be carried out by one or more components of the controller 260 of FIG. 8. The method 300 begins with receiving (block 302), at a controller, an input indicative of a selected or desired focal point for a curve approximated by a plurality of light sources on a display panel. The focal point may be selected based on a calculation or determination of curve characteristics. The selected focal point may correspond to a point towards which the light sources are oriented to emit light with a maximum intensity. The curve may be approximated by the specific angling of the light sources relative to each other on the display panel. The input may also include and/or be indicative of other characteristics such as a curve. That is, the input may, in some embodiments, be indicative of a curve desired to be approximated by an assembly of display panels. Indeed, the display panel may be one display panel in the assembly of display panels such that the assembly of display panels are faceted in a way that approximates a curve.

The method 300 proceeds with determining (block 304), at the controller, an angle of each light source of the plurality of light sources on the display panel that points toward the selected focal point. In particular, the controller determines a specific angle that orients light from each light source to have a relative maximum intensity when an image observed on the display panel is viewed from the selected focal point. In other words, the method 300, at block 304, determines an angle of each light source such that a brightness of the light source is increased when the light source is activated and viewed from the position of the selected focal point and/or portion of a desired focal plane. An overall contrast ratio may be increased in an image received at or near the selected focal point. The angle determined, at block 304, may also correspond to an angle between the normal of the display panel and the orientation of the individual light source. In some embodiments, the angle determined corresponds to an angle between a lens of a light source of the plurality of light sources and the normal of the display panel.

The method 300 continues with sending (block 306), from the controller, a control command to an actuator coupled to each light source to actuate the light source such that light emitted from the light source has a maximum brightness when the emitted light is observed from the selected focal point. The control command may cause the actuator to orient each light source at the angle determined in block 304 for each light source. To put in another way, the control command may cause the actuator to actuate any aspect of the light source such that the brightness of the light source is increased when the light source is viewed from the selected focal point.

Figure 10:
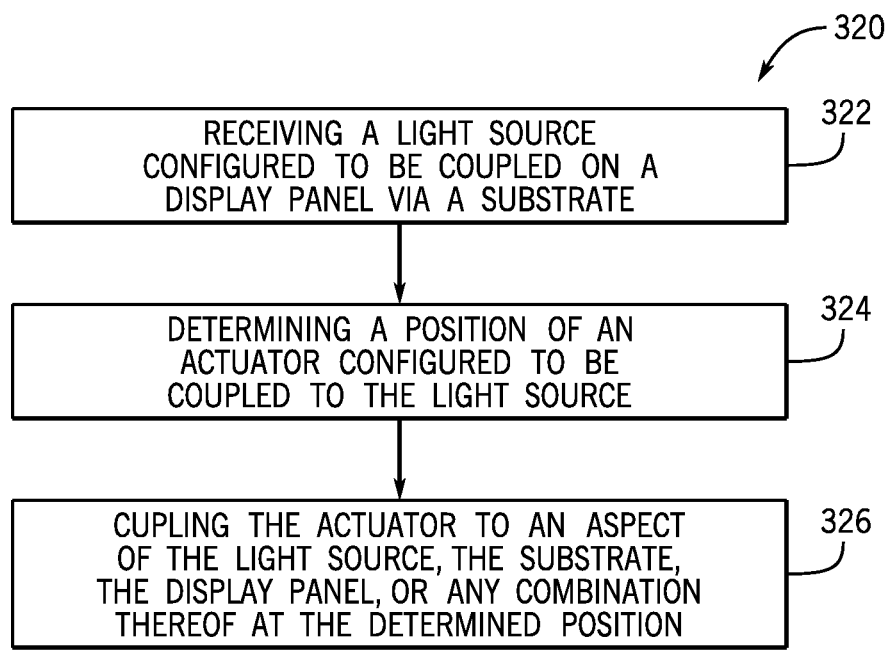
FIG. 10 is a flow diagram of a method for coupling an actuator to an aspect of a light source disposed on a display panel, in accordance with an embodiment of the present disclosure.

FIG. 10 is a flow diagram of a method 320 for actuating a light source on a display panel, in accordance with an embodiment. The method 320 may be utilized in manufacturing light sources that may be angled relative to adjacent light sources on a display panel. The method 320 includes receiving (block 322) a light source that is to be coupled to/on a display panel via a substrate. The substrate and/or display panel may be a printed circuit board having circuitry which electrically powers and determines the frequencies of light emitted from the light source at specific times. Further, the light source may be a lens LED such as to provide a brightness differential with respect to a viewing angle.

The method 320, at block 324, proceeds with determining a position of an actuator configured to be coupled to the light source. As mentioned earlier, the actuator may operate or actuate similar components or aspects of the light sources as the actuators of FIGS. 5-8. Further, the actuator may be coupled to any component of the light source such as a casing of the light source, a primary lens of the light source, etc. The actuator may also be coupled a position near or on the position where the light source is coupled to the display panel. That is, the actuator may be soldered to the display panel and the light source coupled to the actuator such that the actuator rotates the light source towards a focal point. Further, the actuator may be coupled to a component that is external to the light source, such as a secondary lens, for example. In this case, the actuator, may not necessarily actuate the light source, but rather, the secondary lens so as to direct light from the light source towards a desired position. The angle of each light source could also be determined using a computer algorithm that receives an input of a selected or desired focal point and/or a desired curve, for example, and outputs angles that correspond to each light source of the plurality of light sources on the display panel based on a position of each light source on the display panel.

The method 320 proceeds with coupling (block 326) the actuator, at the determined position, to an aspect of the light source, the substrate, the display panel, or any combination thereof. Block 326 may include soldering the actuator to the aspect of the light source (e.g., a casing of the light source, a primary lens of the light source), the substrate, the display panel, or any combination thereof. Block 326 may also include utilizing computer technology that electrically and mechanically couples the actuator to the aspect of the light source (e.g., a casing of the light source, a primary lens of the light source, etc.), the substrate, the display panel, or any combination thereof.

Figure 11:
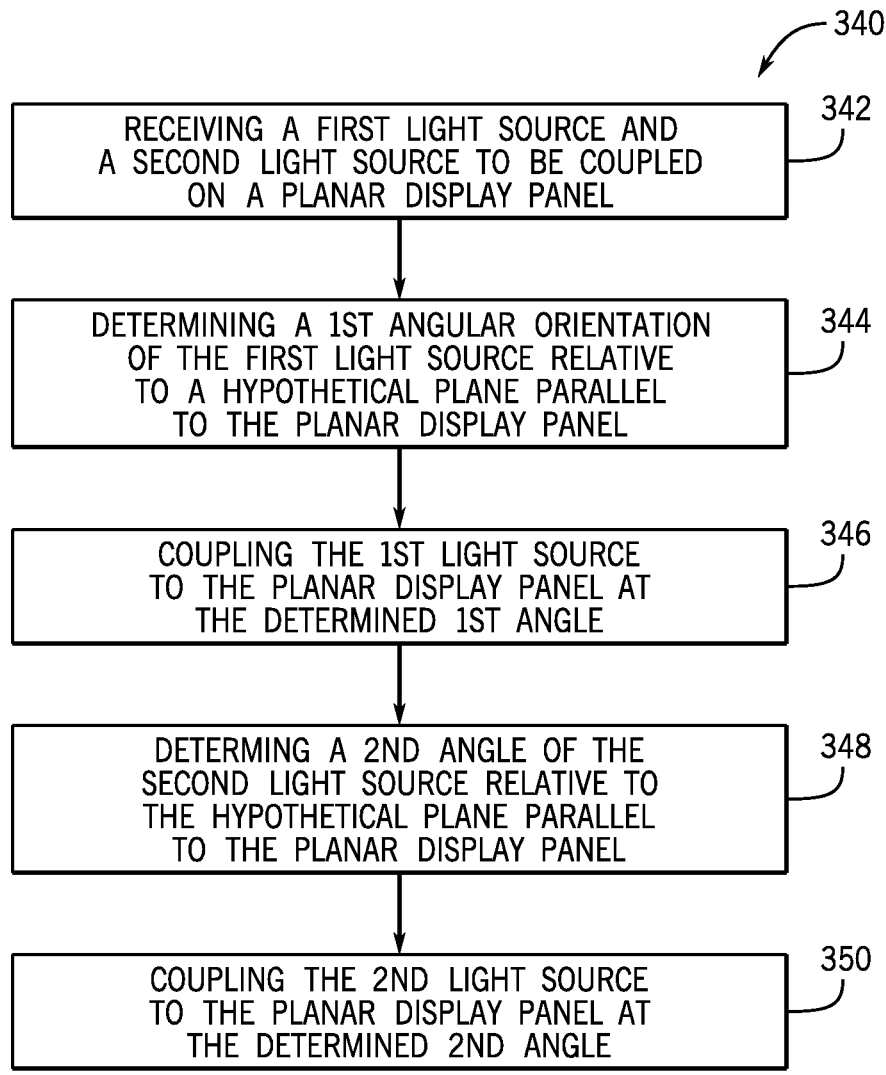
FIG. 11 is a flow chart of a method for angling light sources on a planar display panel towards a focal point, in accordance with an embodiment of the present disclosure.

FIG. 11 is a flow chart of a method 340 for angling light sources on a planar display panel towards a focal point, in accordance with an embodiment. It should be noted that one or more steps of the method 340 may or may not be included in a manufacturing process of a faceted screen. The method 340 begins with receiving (block 342), a first light source and a second light source to be coupled on a planar display panel. As mentioned earlier, the substrate and/or the planar display panel may be a printed circuit board having circuitry which electrically powers the first light source and the second light source, and determines the frequencies of light emitted from the light source at specific times. The first light source and the second light source may each be an LED or any type of light source.

The method 340 continues with determining (block 344) a first angular orientation of the first light source relative to a hypothetical plane parallel to the planar display panel. For instance, at block 344, when the first light source is an LED pixel, the determined angular orientation may be that of a casing of the first light source and/or another aspect of the first light source. Block 344 may also include determining a position and/or angular orientation of a secondary lens to couple to the first light source.

The method 340 continues with coupling (block 346) the first light source to the planar display panel at the angle given by the first angle, which was determined at block 344. The first light source may be soldered to the planar display panel. Other processes of coupling the first light source to the display panel are possible.

The method 340 proceeds with determining (block 348) a second angle of the second light source relative to the hypothetical plane parallel to the planar display panel. The second angle may be an angle different in magnitude than the first angle. Further, the second angle may be different from the first angle because the planar display panel may be one of an assembly of display panels that are assembled so as to approximate a curve. The second light source on the planar display panel may be at a location different from the first angle such that the second angle may need to have a different angular magnitude than the first angle to increase a level of brightness observed at a hypothetical focal point of the curve being approximated by the assembly of planar display panels.

The method 340 proceeds with coupling (block 350) the second light source to the planar display panel at the angle given by the second angle, which was determined at block 348. The second light source may be soldered to the planar display panel. Other processes of coupling the second light source to the planar display panel are possible.

It should be noted that although many of the disclosed techniques are described above in the context of an LED light source, e.g., an LED pixel, the disclosed techniques may be applicable for other types of display technology that uses light sources as parts of panels forming a faceted screen. Further, while certain embodiments have been disclosed in the context of a dome faceted screen, it should be understood that other curved display structures are contemplated, such as displays forming all or part of an animatronic figure, a prop element, or other parts of an entertainment environment.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A faceted screen system, comprising:
   a curved backing surface;
   a first planar panel coupled to the curved backing surface;
   a second planar panel coupled to the curved backing surface, wherein the first planar panel and the second planar panel are angled towards a hypothetical focal point of the curved backing surface;
   a first plurality of light sources disposed on the first planar panel, wherein individual light sources of the first plurality of light sources are oriented at respective different angles relative to the first planar panel to emit light towards the hypothetical focal point; and
   a second plurality of light sources disposed on the second planar panel, wherein individual light sources of the second plurality of light sources are oriented at respective different angles relative to the second planar panel to emit light towards the hypothetical focal point.

2. The faceted screen system of claim 1, wherein the first planar panel and the second planar panel are positioned symmetrically across a hypothetical optical axis of the curved backing surface.

3. The faceted screen system of claim 1, wherein a hypothetical vertex formed by a first line extending from a first edge of the first planar panel and a second line extending from a second edge of the second planar panel comprises an obtuse angle.

4. The faceted screen system of claim 1, wherein the first planar panel abuts the second planar panel at an optical axis of the curved backing surface.

5. The faceted screen system of claim 1, wherein the respective different angles of the individual light sources of the first plurality of light sources successively decrease in magnitude toward a hypothetical optical axis of the curved backing surface.

6. The faceted screen system of claim 1, wherein the respective different angles of the individual light sources of the first plurality of light sources successively decrease in magnitude by a common factor or in a stepwise manner toward a hypothetical optical axis of the curved backing surface.

7. The faceted screen system of claim 1, wherein at least a portion of the first plurality of light sources are not oriented at an angle perpendicular to the first planar panel.

8. The faceted screen system of claim 1, wherein neighboring light sources of the first plurality of light sources are oriented at different angles relative to the first planar panel.

9. The faceted screen system of claim 1, wherein the first plurality of light sources and/or the second plurality of light sources comprise light emitting diodes (LEDs).

10. The faceted screen system of claim 1, wherein each individual light source of the first plurality of light sources and of the second plurality of light sources is oriented to emit light having at least a relative maximum intensity along a hypothetical line extending from each of the individual light sources of the first plurality of light sources and of the second plurality of light sources and to the hypothetical focal point.

11. A faceted screen system, comprising:
a display panel assembly, wherein the display panel assembly comprises:
a first planar panel;
a second planar panel, wherein the first planar panel and the second planar panel are oriented such that a first line extending from a first edge of the first planar panel and a second line extending from the second planar panel form a vertex;
a first plurality of light sources disposed on the first planar panel such that a first individual light source of the first plurality of light sources forms a first angle with a surface of the first planar panel and a first neighboring light source of the first plurality of light sources forms a second angle with the surface of the first planar panel, wherein the first angle is different than the second angle; and
a second plurality of light sources disposed on a second surface of the second planar panel such that a second individual light source of the second plurality of light sources forms a third angle with the second surface of the second planar panel and a second neighboring light source of the second plurality of light sources forms a fourth angle with the second emitting surface of the second planar panel, wherein the third angle is different than the fourth angle.

12. The faceted screen system of claim 11, wherein the first planar panel and the second planar panel are positioned symmetrically across a hypothetical optical axis of a curved backing surface.

13. The faceted screen system of claim 12, wherein the first planar panel abuts the second planar panel at the hypothetical optical axis of the curved backing surface.

14. The faceted screen system of claim 11, wherein the first plurality of light sources and the second plurality of light sources are configured to emit light having a relative maximum intensity towards a common location.

15. The faceted screen system of claim 14, wherein the common location is a hypothetical focal point of a curved backing surface coupled to the first planar panel and the second planar panel.

16. The faceted screen system of claim 11, wherein a difference in magnitude of the first angle and the second angle is the same as a difference in magnitude of the third angle and the fourth angle.

17. A faceted screen control system, comprising:
a plurality of actuators coupled to respective light sources of a plurality of light sources;
a controller configured to:
receive an input indicative of a selected focal point towards which to orient the plurality of light sources disposed on a plurality of planar display panels, the plurality of planar display panels forming a faceted assembly approximating a curve;
determine an orientation of each light source of the plurality of light sources; and
send a control command to the plurality of actuators to actuate the respective light sources of the plurality of light sources to cause the respective light sources to emit light towards the selected focal point.

18. The faceted screen control system of claim 17, wherein each actuator of the plurality of actuators is individually addressable by the controller.

19. The faceted screen control system of claim 17, wherein actuating the respective light sources comprises changing an angular orientation of each light source of the plurality of light sources relative to a planar display panel of the plurality of planar display panels.

20. The faceted screen control system of claim 17, comprising a memory that stores orientation angles for each light source of the plurality of light sources relative to a planar display panel of the plurality of planar display panels and corresponding actuation instructions, wherein the controller accesses the memory to determine the control command.

* * * * *